(12) United States Patent
Tezuka et al.

(10) Patent No.: US 8,707,755 B2
(45) Date of Patent: Apr. 29, 2014

(54) REFERENCE VIBRATOR FOR AN UNBALANCE MEASUREMENT DEVICE

(75) Inventors: Atsushi Tezuka, Tokyo (JP); Naomichi Omori, Tokyo (JP); Hiroshi Tsuchiya, Tokyo (JP)

(73) Assignee: IHI Corporation, Tokyo (JP)

(\*) Notice: Subject to any disclaimer, the term of this patent is extended or adjusted under 35 U.S.C. 154(b) by 330 days.

(21) Appl. No.: 12/935,222

(22) PCT Filed: Mar. 10, 2009

(86) PCT No.: PCT/JP2009/054486
§ 371 (c)(1),
(2), (4) Date: Sep. 28, 2010

(87) PCT Pub. No.: WO2009/119303
PCT Pub. Date: Oct. 1, 2009

(65) Prior Publication Data
US 2011/0067494 A1    Mar. 24, 2011

(30) Foreign Application Priority Data
Mar. 28, 2008 (JP) ................. 2008-086922

(51) Int. Cl.
*G01M 1/02* (2006.01)
*G01M 1/14* (2006.01)

(52) U.S. Cl.
USPC ................. 73/1.84; 73/662; 73/663

(58) Field of Classification Search
USPC .......... 73/1.84, 455–487, 662–672
See application file for complete search history.

(56) References Cited

U.S. PATENT DOCUMENTS

| | | | | |
|---|---|---|---|---|
| 2,622,437 A | * | 12/1952 | Frank | 73/462 |
| 2,789,427 A | * | 4/1957 | Brier | 73/1.15 |
| 3,034,330 A | * | 5/1962 | Jaworowicz | 73/1.84 |
| 3,213,689 A | * | 10/1965 | Cain et al. | 73/462 |
| 3,308,647 A | * | 3/1967 | Crawford | 73/1.84 |
| 3,681,967 A | | 8/1972 | Hines et al. | |

(Continued)

FOREIGN PATENT DOCUMENTS

| | | | | |
|---|---|---|---|---|
| JP | 2000227381 A | * | 8/2000 | G01M 7/00 |
| JP | 2002039904 A | | 2/2002 | |
| JP | 2004219197 A | * | 8/2004 | G01M 7/02 |
| JP | 2005326185 A | | 11/2005 | |

OTHER PUBLICATIONS

International Search Report issued in corresponding application No. PCT/JP2009/054486, completed Apr. 20, 2009, mailed Apr. 28, 2009.

*Primary Examiner* — David A Rogers
(74) *Attorney, Agent, or Firm* — Griffin & Szipl, P.C.

(57) ABSTRACT

A reference vibrator 10 of the present invention includes: a vibrator body 11 configured to mount to a mount 4 in an unbalance measurement device 1 to which a rotary product is mounted at the time of unbalance measurement, in a same mounting state as the rotary product; a vibration generator 12 fixed to the vibrator body 11 and that applies vibrations to the vibrator body 11; and a control unit 13 that controls the vibration generator 12. Because vibration is caused by the vibration generator 12 fixed to the vibrator body 11, repeatability of vibration force is high. This makes it possible to apply vibrations for repeatability check to the unbalance measurement device 1 with an accurate vibration force. Thus, variations in vibration force can be eliminated, and the repeatability of the unbalance measurement device 1 can be properly checked.

10 Claims, 3 Drawing Sheets

(56) References Cited

U.S. PATENT DOCUMENTS

| | | | | |
|---|---|---|---|---|
| 4,250,555 A * | 2/1981 | Mitchell et al. | | 702/105 |
| 4,283,952 A * | 8/1981 | Newman | | 73/579 |
| 4,348,885 A * | 9/1982 | Mueller | | 73/1.14 |
| 4,423,632 A * | 1/1984 | Madden et al. | | 73/462 |
| 4,441,355 A * | 4/1984 | Rothamel | | 73/462 |
| 4,450,529 A * | 5/1984 | Hill et al. | | 700/279 |
| 4,660,419 A * | 4/1987 | Derkacs et al. | | 73/622 |
| 4,716,761 A * | 1/1988 | Ito et al. | | 73/114.77 |
| 4,905,519 A * | 3/1990 | Makowski | | 73/657 |
| 4,926,341 A * | 5/1990 | Guyot | | 700/279 |
| 5,033,302 A * | 7/1991 | Monch | | 73/460 |
| 5,154,567 A * | 10/1992 | Baker et al. | | 73/665 |
| 5,277,063 A * | 1/1994 | Thomas | | 73/457 |
| 5,542,294 A * | 8/1996 | Douglas | | 73/462 |
| 5,589,637 A * | 12/1996 | Hobbs | | 73/663 |
| 5,600,062 A * | 2/1997 | Moench | | 73/462 |
| 5,627,762 A * | 5/1997 | Cameron et al. | | 700/279 |
| 5,659,136 A * | 8/1997 | Koch et al. | | 73/462 |
| 5,717,138 A * | 2/1998 | Goebel | | 73/462 |
| 5,800,331 A * | 9/1998 | Song | | 494/7 |
| 5,805,464 A * | 9/1998 | Cameron et al. | | 700/279 |
| 5,836,202 A * | 11/1998 | Hobbs | | 73/665 |
| 5,903,855 A * | 5/1999 | Kiyota | | 702/86 |
| 6,062,086 A * | 5/2000 | Hess | | 73/663 |
| 6,305,211 B1* | 10/2001 | Thelen et al. | | 73/1.14 |
| 6,435,027 B1* | 8/2002 | Colarelli et al. | | 73/462 |
| 6,595,052 B2* | 7/2003 | Wharton | | 73/460 |
| 6,786,093 B2* | 9/2004 | Miura | | 73/462 |
| 6,931,911 B1* | 8/2005 | Delmoro et al. | | 73/1.14 |
| 7,055,368 B2* | 6/2006 | Schneider et al. | | 73/1.87 |
| 7,412,884 B2* | 8/2008 | Feldmann et al. | | 73/462 |
| 7,523,668 B2* | 4/2009 | Busch et al. | | 73/649 |
| 7,654,138 B2* | 2/2010 | Thelen | | 73/471 |
| 7,946,172 B2* | 5/2011 | Rogalla et al. | | 73/475 |
| 8,240,214 B2* | 8/2012 | Lee | | 73/663 |
| 8,365,406 B2* | 2/2013 | Cornelio | | 29/889.2 |
| 2002/0148276 A1* | 10/2002 | Goebel | | 73/1.14 |
| 2005/0127960 A1* | 6/2005 | Nagano | | 327/141 |
| 2006/0010976 A1* | 1/2006 | Kyogoku | | 73/468 |
| 2007/0044555 A1* | 3/2007 | Busch et al. | | 73/471 |
| 2008/0271530 A1* | 11/2008 | Arakawa et al. | | 73/462 |
| 2009/0183556 A1* | 7/2009 | Shimizu et al. | | 73/66 |
| 2011/0011169 A1* | 1/2011 | Schrotter | | 73/116.02 |

* cited by examiner

REFERENCE VIBRATOR FOR AN UNBALANCE MEASUREMENT DEVICE

This is a National Phase Application in the United States of International Patent Application No. PCT/JP2009/054486 filed Mar. 10, 2009, which claims priority on Japanese Patent Application No. 2008-086922, filed Mar. 28, 2008. The entire disclosures of the above patent applications are hereby incorporated by reference.

BACKGROUND OF THE INVENTION

1. Field of the Invention

The present invention relates to a reference vibrator that is mounted to an unbalance measurement device for a rotary product and applies vibrations for repeatability check to the unbalance measurement device.

2. Description of the Related Art

In this application, the term "rotary product" means a device, such as a supercharger, that has a rotor inside.

For example, in manufacture of a high-speed rotary machine such as a supercharger, for inspecting and correcting balance performance of the rotary product at the time of high-speed rotation, a high-speed rotation balance test is conducted to measure an unbalance amount and perform unbalance correction. An unbalance measurement device is used for the measurement of the unbalance amount.

FIG. 1 shows a configuration of an unbalance measurement device 30 disclosed in a Patent Document 1 given below. This unbalance measurement device 30 is configured as a measurement device for a supercharger 41. The unbalance measurement device 30 includes: a vibration table 35 in which a plurality of spring elements 33 (for example, round rods) are secured to a top surface of a base 32 fixed on a floor surface 31, and an upper plate 34 is fixed and supported on the top of the spring elements 33; a turbine casing (product mount) 37 fixed on the vibration table 35 by a bolt 44 via a turbine casing mounting plate 36; an acceleration sensor 38 attached to the turbine casing mounting plate 36; a rotation detector 39 placed near a tip of a compressor impeller 42 of the supercharger 41; and a calculator 40 that calculates an unbalance amount and its position on the basis of detection signals from the acceleration sensor 38 and the rotation detector 39.

In the case of performing unbalance measurement by the above-mentioned unbalance measurement device 30, the rotary product (such as the supercharger 41) is mounted to the turbine casing 37, and air is introduced into the turbine casing 37 to rotate a turbine impeller 43 of the supercharger 41, thereby rotating a supercharger rotor composed of the turbine impeller 43, a shaft 45, and the compressor impeller 42. When a predetermined rotation speed for the unbalance measurement is reached, acceleration (vibration) is detected by the acceleration sensor 38, and also a rotation angle is detected by the rotation detector 39. An unbalance amount and its position are calculated by the calculator 40 on the basis of detection signals of the detected acceleration and rotation angle.

[Patent Document 1]
Japanese Patent Application Laid-Open No. 2002-39904

To stably detect the unbalance amount of the rotary product with constant accuracy, the unbalance measurement device needs to be calibrated not only at the time of manufacture but also at an appropriate timing after the manufacture. For instance, there is a need to replace the product mount (the turbine casing 37 in FIG. 1) according to the type of product that is subject to the unbalance measurement. Repeatability can be affected depending on, for example, the extent of tightening of the mount fixing bolt (the bolt 44 in FIG. 1) upon this replacement. Therefore, it is necessary to check and calibrate the repeatability of the unbalance measurement device.

Conventionally, when checking and calibrating the repeatability of the unbalance measurement device, for example a rotary product with excellent vibration properties is mounted to the mount as a reference rotor, and the reference rotor is rotated. However, repeatability of a vibration force of the reference rotor is poor, due to factors such as changes or variations in vibration state caused by environmental conditions and degradation of the reference rotor. This makes it impossible to judge whether the repeatability of the vibration force of the reference rotor is poor or the repeatability of the measurement device is poor, and so there is a problem of difficulty in properly checking the repeatability of the unbalance measurement device.

SUMMARY OF THE INVENTION

The present invention was made in view of the above problem, and has an object of providing a reference vibrator that makes it possible to properly check the repeatability of the unbalance measurement device.

To achieve the stated object, the reference vibrator of the present invention employs the following technical means.

(1) The present invention is a reference vibrator that is mounted to an unbalance measurement device for a rotary product having a rotor inside, and applies vibrations for repeatability check to the unbalance measurement device, the reference vibrator comprising: a vibrator body configured to be mounted to a mount in the unbalance measurement device for mounting the rotary product, in a same mounting state as the rotary product; a vibration generator that is fixed to the vibrator body and applies vibrations to the vibrator body; and a control unit that controls the vibration generator.

Here, the term "vibration generator" includes not only a generator that generates a vibration force unidirectionally without mechanical rotation, but also a generator that generates vibrations by mechanical rotation, such as a structure in which an unbalance weight is attached to a high-accuracy rotor such as a high-speed spindle motor.

According to the above configuration of the present invention, vibration is caused by the vibration generator fixed to the vibrator body. This contributes to high repeatability of the vibration force, unlike the conventional reference rotor equivalent to the rotary product that is subject to the measurement. As a result, vibrations for repeatability check can be applied to the unbalance measurement device with the accurate vibration force. Thus, variations in vibration force can be eliminated, and the repeatability of the unbalance measurement device can be properly checked.

(2) Moreover, in the reference vibrator of the above (1), the vibration generator is a unidirectional vibrator that generates a unidirectional vibration force.

According to the above configuration, stable vibrations can be applied by using the unidirectional vibrator without mechanical rotation as the vibration generator.

(3) Moreover, in the reference vibrator of the above (2), the unidirectional vibrator is an inertial vibrator that generates a vibration force by a reaction force of vibrations of an inertial mass.

According to the above configuration, a stable sine vibration force can be applied to the mount of the unbalance measurement device, by using the inertial vibrator. In this way, vibrations very similar to vibrations generated by the rotary product can be accurately applied to the unbalance measurement device.

(4) Moreover, in the reference vibrator of the above (2) or (3), a force sensor is provided between the vibrator body and the unidirectional vibrator.

According to the above configuration, by measuring the vibration force generated by the vibration generator using the force sensor in order to measure the true vibration force applied to the mount, variations in vibration force of the vibration generator can be corrected, too.

(5) Moreover, in the reference vibrator of any of the above (1) to (4), two vibration generators are fixed to the vibrator body so that vibration directions of the two vibration generators cross each other at right angles, and the control unit controls the two vibration generators so as to form a Lissajous circle of a vibration force.

According to the above configuration, by forming the Lissajous circle of the vibration force by two inertial vibrators, the same vibration force as a rotary vibration force generated by the actual rotary product can be simulated. This allows for a more accurate simulation of the vibration force, so that the repeatability of the unbalance measurement device can be checked more closely.

As described above, according to the present invention, the repeatability of the unbalance measurement device can be properly checked.

DESCRIPTION OF THE PREFERRED EMBODIMENTS

Preferred embodiments of the present invention are described in detail below, with reference to attached drawings. Note that the common parts of the drawings are given the same reference signs and their explanation will not be repeated.

Figure 1:
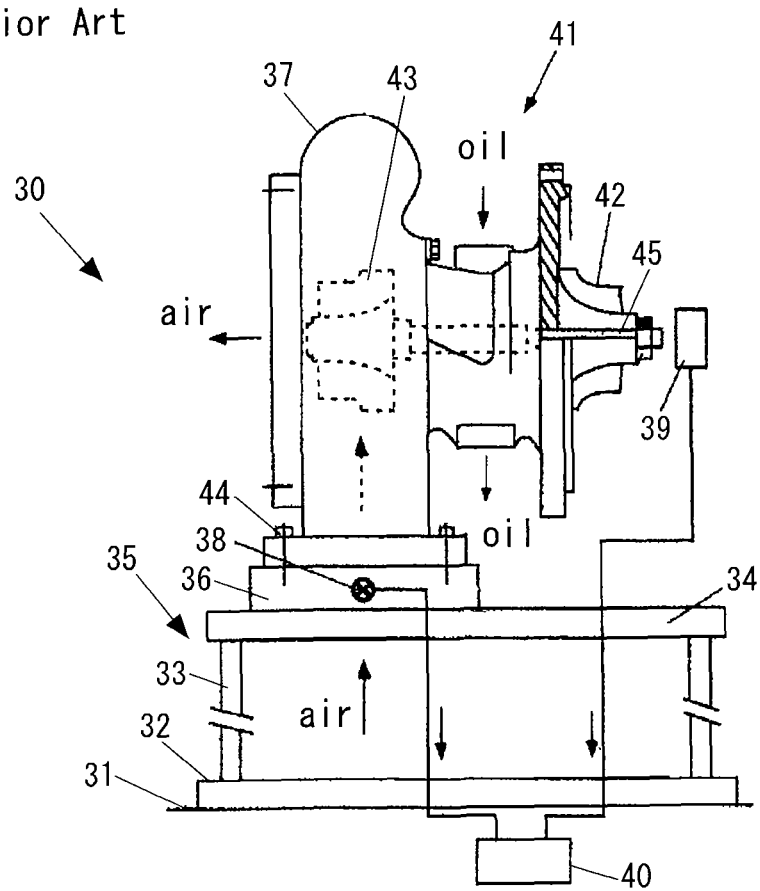
FIG. 1 is a configuration diagram of an unbalance measurement device disclosed in Patent Document 1.
Figure 2:
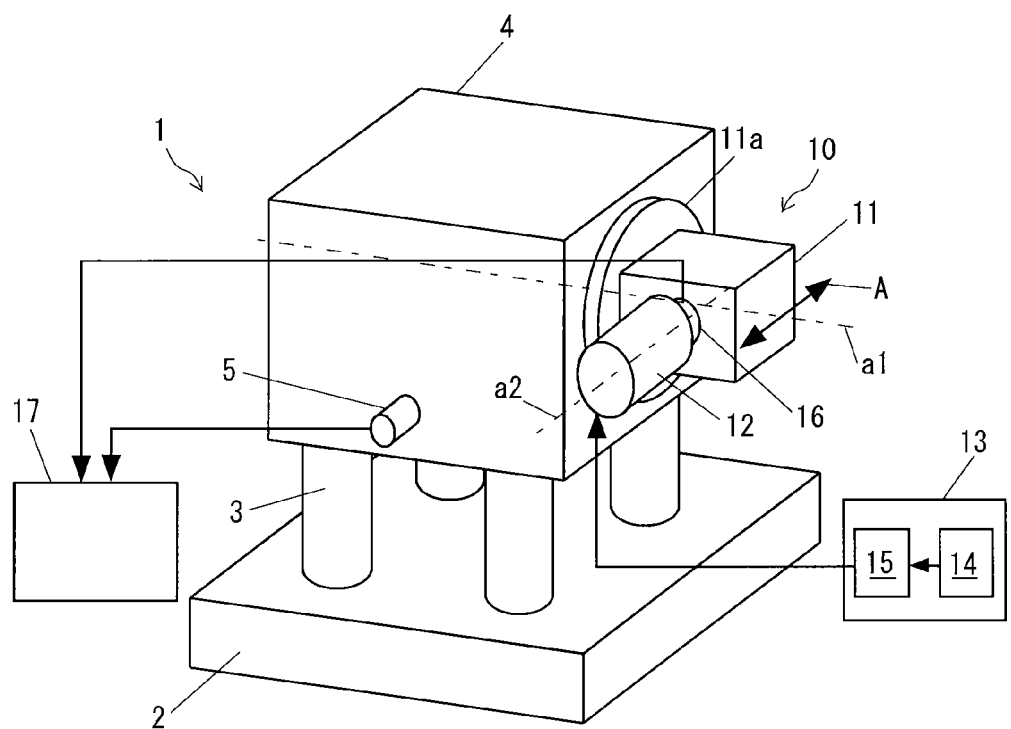
FIG. 2 is a schematic configuration diagram of a reference vibrator according to a first embodiment of the present invention.

FIG. 2 is a schematic configuration diagram of a reference vibrator 10 according to a first embodiment of the present invention. The reference vibrator 10 in a state of being mounted and fixed to an unbalance measurement device 1 is shown in FIG. 2.

A configuration of the unbalance measurement device 1 is described first.

The unbalance measurement device 1 includes: a base 2 fixed on a floor surface or the like; a plurality of rodlike spring members 3 that are secured on the base 2 and function as springs; a mount 4 fixed and supported on the top of the spring members 3; a vibration sensor 5 attached to the mount 4; a rotation detector not illustrated; and a calculator 17 that calculates an unbalance amount and a position.

The number of spring members 3 and a spring constant of the spring members 3 are set to an appropriate number and value, in accordance with a material (hardness) of the spring members 3 and a frequency (rotation speed) for performing an unbalance measurement.

The mount 4 is configured so that a rotary product (for example, a supercharger) can be mounted thereto. Though the reference vibrator 10 is mounted to the mount 4 in FIG. 2, the rotary product is mounted to the mount 4 when performing the unbalance measurement.

The vibration sensor 5 may be any kind of sensor capable of detecting vibrations, like the one used in the conventional unbalance measurement. For example, an acceleration sensor, a speed sensor, and a displacement sensor may be used singly or in combination.

Though not illustrated, when performing the unbalance measurement, the above-mentioned rotation detector is placed near a rotation shaft of the rotary product mounted to the mount 4 and detects a rotation angle of the rotation shaft from a reference position.

The calculator 17 calculates the unbalance amount and its position on the basis of detection signals from the vibration sensor 5 and the rotation detector, in the same way as the conventional technique. Furthermore, the calculator 17 calculates a mechanical impedance of the mount 4 on the basis of a detection signal from a force sensor 16 and the detection signal from the vibration sensor 5. This will be described in detail later.

A configuration of the reference vibrator 10 is described next.

In FIG. 2, the reference vibrator 10 includes a vibrator body 11, a vibration generator 12, and a control unit 13.

The vibrator body 11 has an attachment 11a identical in shape to a mount attachment of the rotary product whose vibrations are to be simulated. Moreover, a fixing means (not illustrated) for mounting the vibrator body 11 to the mount 4 and a fixing means for mounting the rotary product to the mount 4 are common. Thus, the vibrator body 11 is configured to be mounted to the mount 4 of the unbalance measurement device 1 in a same mounting state as the rotary product.

A gravity center position of the vibrator body 11 are preferably set to be equivalent to a gravity center position of the rotary product whose vibrations are to be simulated. As a result, the vibrations of the rotary product can be closely simulated. Note that, though the vibrator body 11 may simulate the rotary product in shape, the shape is not particularly important in terms of vibration simulation, so that the shape of the rotary product is not simulated in the configuration example of FIG. 2.

The vibration generator 12 is fixed to the vibrator body 11, and applies vibrations to the vibrator body 11. The vibration generator 12 may be any of a generator with mechanical rotation and a generator without mechanical rotation, as long as it can be autonomously driven by electromagnetic energy and generate vibrations at least at a frequency corresponding to the rotation speed for the unbalance measurement.

Accordingly, the vibration generator 12 may be a structure in which an unbalance weight is attached to a high-accuracy rotor such as a high-speed spindle motor. In terms of applying stable vibrations, however, the vibration generator 12 is preferably a unidirectional vibrator that generates a unidirectional vibration force (that is, a linear vibration force). A piezo element (piezoelectric element) that generates a vibration force by converting a voltage to a force or an inertial vibrator that generates a vibration force by a reaction force of vibrations of an inertial mass is applicable as such a unidirectional vibrator.

In this embodiment, the vibration generator 12 is an inertial vibrator. The inertial vibrator is capable of applying a stable sine vibration force to the mount 4 of the unbalance measurement device 1, so that vibrations very similar to vibrations generated by the rotary product can be accurately applied to the unbalance measurement device 1.

In the configuration example of FIG. 2, a vibration direction of the vibration generator 12 (inertial vibrator) is a direction of the arrow A in the drawing (horizontal direction). The vibration sensor 5 is attached to a side surface of the mount 4 so as to detect vibrations in the horizontal direction. Note that the inertial vibrator and the vibration sensor 5 may be placed so that vibrations in a vertical direction can be simulated and detected, according to need.

In FIG. 2, a line designated by the sign a1 is a rotation centerline of the rotation shaft of the rotary product when the rotary product is mounted to the mount 4. On the other hand, a line designated by the sign a2 is a centerline of the vibration generator 12 in the vibration direction.

In the configuration example of FIG. 2, the vibration generator 12 is placed so that its vibration direction centerline a2 crosses the above-mentioned rotation centerline a1 of the rotary product whose vibrations are to be simulated, at right angles. According to this configuration, the vibrations generated by the rotation shaft of the rotary product can be closely simulated.

The vibration generator 12 is controlled by the control unit 13. Since the vibration generator 12 is an inertial vibrator in this embodiment, the control unit 13 includes a sine oscillator 14 and an amplifier 15, and controls the vibration generator 12 to a desired number of vibrations (frequency) by applying a sine signal to the vibration generator 12.

In the configuration example of FIG. 2, the force sensor 16 is provided between the vibrator body 11 and the vibration generator 12. A load cell, a piezoelectric element, or the like may be used as the force sensor 16. The detection signal of the force sensor 16 is input in the calculator 17. Though the force sensor 16 is not an essential component of the reference vibrator 10 in the present invention, by measuring the vibration force generated by the vibration generator 12 using the force sensor 16 in order to measure the true vibration force applied to the mount 4, variations in vibration force of the vibration generator 12 can be corrected, too.

To check and calibrate the repeatability of the unbalance measurement device 1 using the above-mentioned reference vibrator 10, the reference vibrator 10 is mounted to the mount 4, and the vibrations of the vibration generator 12 are controlled by the control unit 13 to reach the frequency for the unbalance measurement. The vibration force is detected by the force sensor 16 while the vibrations are detected by the vibration sensor 5, and a mechanical impedance I of the mount 4 is calculated by the calculator 17.

When the vibration force of the vibration generator 12 is denoted by $A(\omega)$, for example, $F \sin \omega t$, and the output of the vibration sensor 5 is denoted by $B(\omega)$, for example, $\alpha \sin(\omega t + \emptyset)$ having a phase difference $\emptyset$ from A, the mechanical impedance $I(\omega)$ of the mount 4 is given by $I(\omega)=B(\omega)/A(\omega)$. Therefore, the repeatability can be checked according to whether or not the measured mechanical impedance I of the mount 4 matches a reference impedance at the frequency, or whether or not the measured mechanical impedance I of the mount 4 is within a permissible error range from the reference impedance at the frequency.

In the case where the measured mechanical impedance I does not match the reference impedance or is not within the permissible error range from the reference impedance, calibration is performed such as by adjusting the extent of fixing of the mount 4 so that the mechanical impedance I becomes proper.

Moreover, in addition to evaluating the mechanical impedance I at the frequency for the unbalance measurement, the mechanical impedance I may be calculated and evaluated over the whole range of the rotation speed used for the product.

In the case of not providing the force sensor 16 in the reference vibrator 10, the vibration force of the vibration generator 12 cannot be detected. In such a case, however, the vibration force of the vibration generator 12 may be obtained beforehand and used when calculating the mechanical impedance.

According to the above embodiment of the present invention, the following advantages can be obtained.

Vibration is caused by the vibration generator 12 fixed to the vibrator body 11. This contributes to high repeatability of the vibration force, unlike the conventional reference rotor equivalent to the rotary product that is subject to the measurement. As a result, vibrations for repeatability check can be applied to the unbalance measurement device 1 with the accurate vibration force. Thus, variations in vibration force can be eliminated, and the repeatability of the unbalance measurement device 1 can be properly checked.

Stable vibrations can be applied by using a unidirectional vibrator without mechanical rotation as the vibration generator 12. In particular, a stable sine vibration force can be applied to the mount 4 of the unbalance measurement device 1, by using an inertial vibrator. In this way, vibrations very similar to vibrations generated by the rotary product can be accurately applied to the unbalance measurement device 1.

By measuring the vibration force generated by the vibration generator 12 using the force sensor 16 in order to measure the true vibration force applied to the mount 4, variations in vibration force of the vibration generator 12 can be corrected, too.

Figure 3:
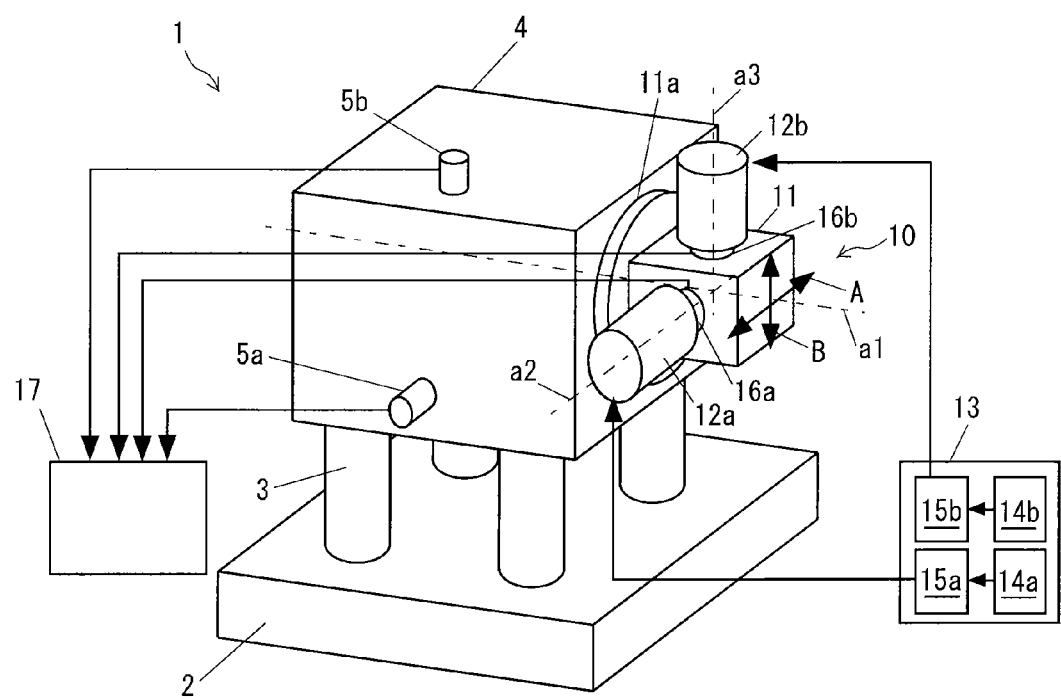
FIG. 3 is a schematic configuration diagram of a reference vibrator according to a second embodiment of the present invention.

FIG. 3 is a schematic configuration diagram of the reference vibrator 10 according to a second embodiment of the present invention.

In this embodiment, two inertial vibrators 12a and 12b are fixed to the vibrator body 11 so that vibration directions of the two inertial vibrators 12a and 12b cross each other at right angles. For simplicity, hereafter one inertial vibrator 12a is referred to as a first vibrator 12a and the other inertial vibrator 12b is referred to as a second vibrator 12b. The first vibrator 12a is placed so as to generate a vibration force in a direction of the arrow A (horizontal direction). The second vibrator 12b is placed so as to generate a vibration force in a direction of the arrow B (vertical direction).

Force sensors 16a and 16b are provided between the first vibrator 12a and the vibrator body 11 and between the second vibrator 12b and the vibrator body 11, respectively. Detection signals of the two force sensors 16a and 16b are input in the calculator 17.

In FIG. 3, a line designated by the sign a1 is a rotation centerline of the rotation shaft of the rotary product when the rotary product is mounted to the mount 4. A line designated by the sign a2 is a centerline of the first vibrator 12a in the vibration direction. A line designated by the sign a3 is a centerline of the second vibrator 12b in the vibration direction. In the configuration example of FIG. 3, the first vibrator 12a is placed so that its vibration direction centerline a2 crosses the above-mentioned rotation centerline a1 of the rotary product whose vibrations are to be simulated, at right angles. Moreover, the second vibrator 12b is placed so that its vibration direction centerline a3 crosses the above-mentioned rotation centerline a1 of the rotary product whose vibrations are to be simulated, at right angles. According to this configuration, the vibrations generated by the rotation shaft of the rotary product can be closely simulated.

The control unit 13 controls the first vibrator 12a and the second vibrator 12b so as to form a Lissajous circle of the vibration force. In detail, the control unit 13 includes a sine oscillator 14a and an amplifier 15a for controlling the first vibrator 12a, and a cosine oscillator 14b and an amplifier 15b for controlling the second vibrator 12b. By setting a phase difference in vibration force between a sine signal sent to the first vibrator 12a and a cosine signal sent to the second vibrator 12b to n/2 or −n/2, the control unit 13 forms the Lissajous circle of the vibration force.

In addition, a vibration sensor 5a for detecting vibrations in the horizontal direction and a vibration sensor 5b for detecting vibrations in the vertical direction are attached to the mount 4 of the unbalance measurement device 1. Detection signals of the two vibration sensors 5a and 5b are input in the calculator 17.

The other configuration of this embodiment is the same as the first embodiment described above, so that its explanation is omitted here.

To check and calibrate the repeatability of the unbalance measurement device 1 using the reference vibrator 10 of the second embodiment described above, the reference vibrator 10 is mounted to the mount 4, and the first vibrator 12a and the second vibrator 12b are controlled by the control unit 13 to the frequency for the unbalance measurement. The vibration forces are detected by the two force sensors 16a and 16b while the vibrations are detected by the two vibration sensors 5a and 5b, and a mechanical impedance I1 of the mount 4 in the horizontal direction and a mechanical impedance I2 of the mount 4 in the vertical direction are calculated by the calculator 17.

When the vibration force of the first vibrator 12a is denoted by $A1(\omega)$ and the output of the vibration sensor 5a is denoted by $B1(\omega)$, the mechanical impedance $I1(\omega)$ in the horizontal direction is given by $I1(\omega)=B1(\omega)/A1(\omega)$.

When the vibration force of the second vibrator 12b is denoted by $A2(\omega)$ and the output of the vibration sensor 5b is denoted by $B2(\omega)$, the mechanical impedance $I2(\omega)$ in the vertical direction is given by $I2(\omega)=B2(\omega)/A2(\omega)$.

Therefore, the repeatability of the unbalance measurement device 1 can be evaluated using the above-mentioned mechanical impedances I1 and I2 and the phase difference between the mechanical impedances I1 and I2.

According to this embodiment, by forming the Lissajous circle of the vibration force by the two inertial vibrators 12a and 12b, the same vibration force as the rotary vibration force generated by the actual rotary product can be simulated. This allows for a more accurate simulation of the vibration force, so that the repeatability of the unbalance measurement device 1 can be checked more closely. The other advantages obtained in this embodiment are the same as those in the first embodiment.

Note that the above embodiments describe the case where the reference vibrator 10 of the present invention is used for repeatability check, calibration, and the like of the unbalance measurement device 1 upon replacing (exchanging) the mount 4. However, the present invention is not limited to this. Even when using the same mount 4 without replacing it, the present invention is effective for adjustment operations such as repeatability check and calibration of the unbalance measurement device 1.

The frequency used for vibration is not limited to a constant value, and the vibration repeatability over a wide range of frequencies may be evaluated by gradually increasing or decreasing the rotation speed of the rotary product that is subject to the measurement. Moreover, the mechanical impedance may be instantly measured by applying an impulse signal, pink noise, and white noise.

Although the above description has been made by way of the embodiments of the present invention, the embodiments of the present invention disclosed above are merely examples and the scope of the present invention is not limited to these embodiments of the present invention. The scope of the present invention is indicated by the patent claims, and further includes all modifications within the equivalent meanings and scope of the patent claims.

What is claimed is:

1. A reference vibrator that is mounted to an unbalance measurement device for a rotary product having a rotor inside, and applies vibrations for repeatability check to the unbalance measurement device, the reference vibrator comprising:
    (a) a vibrator body configured to be mounted to a mount in the unbalance measurement device for mounting the rotary product, in a same mounting state as the rotary product, wherein a gravity center position of the vibrator body is set to be equivalent to a gravity center position of the rotary product that is to have vibrations applied for repeatability check to the unbalance measurement device;
    (b) a vibration generator that is fixed to the vibrator body and applies vibrations to the vibrator body; and
    (c) a control unit that controls the vibration generator.

2. The reference vibrator as claimed in claim 1, wherein the vibration generator is a unidirectional vibrator that generates a unidirectional vibration force.

3. The reference vibrator as claimed in claim 2, wherein the unidirectional vibrator is an inertial vibrator that generates a vibration force by a reaction force of vibrations of an inertial mass.

4. A reference vibrator that is mounted to an unbalance measurement device for a rotary product having a rotor inside, and applies vibrations for repeatability check to the unbalance measurement device, the reference vibrator comprising:
    (a) a vibrator body configured to be mounted to a mount in the unbalance measurement device for mounting the rotary product, in a same mounting state as the rotary product;
    (b) a vibration generator that is fixed to the vibrator body and applies vibrations to the vibrator body; and
    (c) a control unit that controls the vibration generator,
    wherein the vibration generator is a unidirectional vibrator that generates a unidirectional vibration force, and wherein a force sensor is provided between the vibrator body and the unidirectional vibrator.

5. The reference vibrator as claimed in claim 4, wherein two vibration generators are fixed to the vibrator body so that vibration directions of the two vibration generators cross each other at right angles, and
    wherein the control unit controls the two vibration generators so as to form a Lissajous circle of a vibration force.

6. A reference vibrator that is mounted to an unbalance measurement device for a rotary product having a rotor inside, and applies vibrations for repeatability check to the unbalance measurement device, the reference vibrator comprising:
    (a) a vibrator body configured to be mounted to a mount in the unbalance measurement device for mounting the rotary product, in a same mounting state as the rotary product, wherein a gravity center position of the vibrator body is set to be equivalent to a gravity center position of the rotary product that is to have vibrations applied for repeatability check to the unbalance measurement device;

(b) a vibration generator that is fixed to the vibrator body and applies vibrations to the vibrator body; and (c) a control unit that controls the vibration generator;

wherein two vibration generators are fixed to the vibrator body so that vibration directions of the two vibration generators cross each other at right angles, and wherein the control unit controls the two vibration generators so as to form a Lissajous circle of a vibration force.

7. A reference vibrator that is mounted to an unbalance measurement device for a rotary product having a rotor inside, and applies vibrations for repeatability check to the unbalance measurement device, the reference vibrator comprising:

(a) a vibrator body configured to be mounted to a mount in the unbalance measurement device for mounting the rotary product, in a same mounting state as the rotary product;

(b) a vibration generator that is fixed to the vibrator body and applies vibrations to the vibrator body; and (c) a control unit that controls the vibration generator, wherein the vibration generator is a unidirectional vibrator that generates a unidirectional vibration force, wherein the unidirectional vibrator is an inertial vibrator that generates a vibration force by a reaction force of vibrations of an inertial mass, and wherein a force sensor is provided between the vibrator body and the unidirectional vibrator.

8. The reference vibrator as claimed in claim 7, wherein two vibration generators are fixed to the vibrator body so that vibration directions of the two vibration generators cross each other at right angles, and wherein the control unit controls the two vibration generators so as to form a Lissajous circle of a vibration force.

9. A reference vibrator that is mounted to an unbalance measurement device for a rotary product having a rotor inside, and applies vibrations for repeatability check to the unbalance measurement device, the reference vibrator comprising:

(a) a vibrator body configured to be mounted to a mount in the unbalance measurement device for mounting the rotary product, in a same mounting state as the rotary product, wherein a gravity center position of the vibrator body is set to be equivalent to a gravity center position of the rotary product that is to have vibrations applied for repeatability check to the unbalance measurement device;

(b) a vibration generator that is fixed to the vibrator body and applies vibrations to the vibrator body, wherein the vibration generator is a unidirectional vibrator that generates a unidirectional vibration force; and (c) a control unit that controls the vibration generator;

wherein two vibration generators are fixed to the vibrator body so that vibration directions of the two vibration generators cross each other at right angles, and wherein the control unit controls the two vibration generators so as to form a Lissajous circle of a vibration force.

10. A reference vibrator that is mounted to an unbalance measurement device for a rotary product having a rotor inside, and applies vibrations for repeatability check to the unbalance measurement device, the reference vibrator comprising:

(a) a vibrator body configured to be mounted to a mount in the unbalance measurement device for mounting the rotary product, in a same mounting state as the rotary product, wherein a gravity center position of the vibrator body is set to be equivalent to a gravity center position of the rotary product that is to have vibrations applied for repeatability check to the unbalance measurement device;

(b) a vibration generator that is fixed to the vibrator body and applies vibrations to the vibrator body, wherein the vibration generator is a unidirectional vibrator that generates a unidirectional vibration force, and wherein the unidirectional vibrator is an inertial vibrator that generates a vibration force by a reaction force of vibrations of an inertial mass; and (c) a control unit that controls the vibration generator;

wherein two vibration generators are fixed to the vibrator body so that vibration directions of the two vibration generators cross each other at right angles, and wherein the control unit controls the two vibration generators so as to form a Lissajous circle of a vibration force.

* * * * *